Feb. 13, 1951 C. H. SPARKLIN 2,541,120
VARIABLE SPEED ELECTRIC MOTOR
Filed Oct. 31, 1946 2 Sheets-Sheet 2
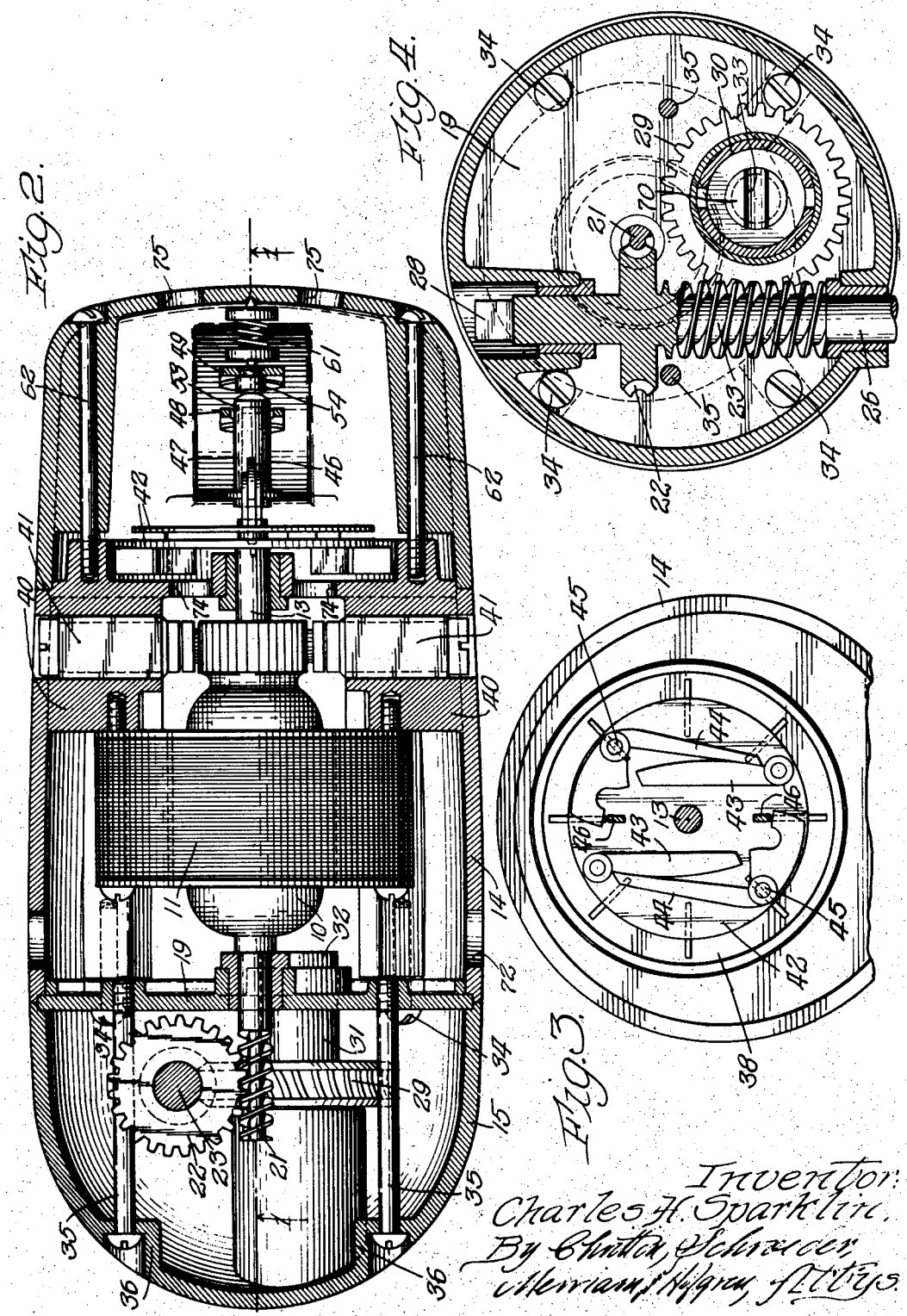
Inventor:
Charles H. Sparklin Patented Feb. 13, 1951

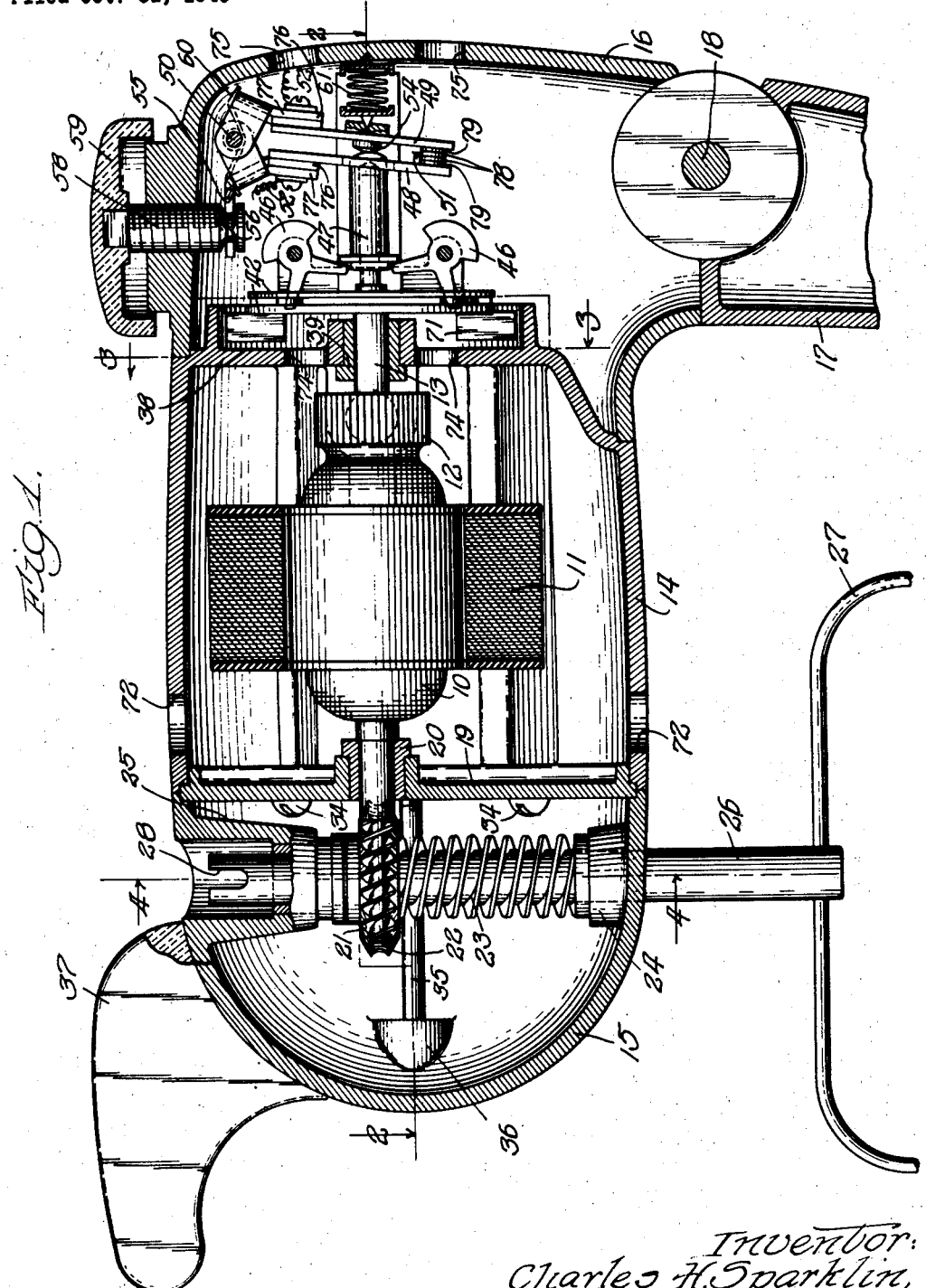

2,541,120

UNITED STATES PATENT OFFICE 2,541,120

VARIABLE SPEED ELECTRIC MOTOR

Charles Harold Sparklin, Chicago, Ill., assignor to Birtman Electric Company, a corporation of Illinois Application October 31, 1946, Serial No. 707,014

1 Claim. (Cl. 172—36)

This invention relates to a motor, particularly a motor having a speed control or a drive shaft separate from the motor shaft, or both, and relates especially to such a motor for use in food mixers or the like. The invention also relates to an improved speed control means.

Applicant has invented a new motor construction having speed control apparatus wherein at least a portion of the speed control means is mounted on a section of the casing and its speed control means may be mounted and dismounted as a unit. The motor also preferably includes various drive shafts or power connections, or a combination of these, mounted on another section of the casing so as to be also mountable and dismountable as a unit. This construction enables the motor and its various controls and power takeoff means to be assembled in more compact form and makes the entire construction cheaper to build and easier to service. The invention also includes improvements in this speed control means itself.

The invention will be described as related to the embodiment set out in the accompanying drawings. Of the drawings Fig. 1 is a longitudinal vertical section taken through the motor assembly along the line 1—1 of Fig. 2; Fig. 2 is a horizontal section taken along line 2—2 of Fig. 1; Fig. 3 is a section taken along line 3—3 of Fig. 1; and Fig. 4 is a section taken along line 4—4 of Fig. 1.

The embodiment shown in the drawings is a food mixer motor comprising an armature 10, a surrounding field coil 11, a commutator 12, a motor shaft 13 upon which the armature and commutator are mounted, a main casing 14 surrounding the motor, a first casing section 15 at the front of the motor assembly, and a second casing section 16 at the rear of the motor assembly. The second casing section is rotatably mounted on a pedestal 17 by means of a hinge pin 18.

The front end of the motor shaft 13 extends through a wall 19 separating the main casing 14 from the first casing section 15. The motor shaft is held in a bearing 20 in this wall and the end of the shaft extending into the first casing section 15 is formed as a worm gear 21.

The worm gear 21 engages a horizontal gear wheel 22 keyed to a second worm gear 23 held in vertical position between a bottom bearing 24 and a top bearing 25 with these bearings forming part of the first casing section 15. Both bearings 24 and 25 have annular cross sections so that tools may be inserted in the openings formed and engage either the bottom or top ends of the worm gear 23. As shown in Fig. 1 the bottom end of the worm gear 23 is connected to an agitator 26 having a beater portion 27. The top end of the worm gear is formed with a notch 28 to which tools such as juice extractors may be attached.

The second worm gear 23 engages a second gear wheel 29 arranged vertically and transverse to the motor assembly. This second gear wheel 29 is concentric with a socket 30 that is mounted on the wall 19 by means of a rear portion 31 extending through the wall until held in place by a boss 32 on the other side of the wall 19. The front of the socket 30 communicates with an opening at the front of the first casing section 15, through which the shafts of power tools may be inserted to engage the slot 33 in a smaller shaft 70.

From the above description it can be seen that the second worm gear 23 and attached gear wheel 22 are mounted on the first casing section 15 and that the second gear wheel 29 and socket 30 are mounted on the wall 19. The wall 19 is separable from the motor casing 14 and is held in place by a plurality of bolts 34. The first casing section 15 is held in place by a plurality of bolts 35 having their heads in recesses 36 at the front of the first casing section 15. This casing section is also provided with a handle 37 on its top surface.

At the rear of the motor casing 14 there is located a wall 38 through which the other end of the motor shaft 13 extends, with this end being held in a bearing 39. This wall is made integral with the motor casing 14, although it may be made separable if desired. The rear of the motor casing 14 contains thickened portions 40 in which are mounted the motor brushes 41.

The speed control means for the motor is mounted within the second casing section 16. The speed governor comprises two parallel plates 42 mounted for rotation on the rear end of the shaft 13, with the plates held in spaced-apart relationship. On the back of the inner plate 42 there is mounted a plurality of radial blades 71 that extend beyond the periphery of the inner plate. These blades act as a fan and set up a circulation of air through the motor when the motor is in operation. The air enters spaced holes 72 at the opposite end of the motor casing 14 and is drawn around the motor, through openings 74 in the wall 38, around the fan, and out rear openings 75 in the casing section 16.

Between the rotatable plates 42 are located a pair of centrifugally responsive arms 43 hingedly mounted at one end of each arm and arranged to be swung outwardly by centrifugal forces acting on the arms. These arms press against bell cranks 44 hingedly mounted on fulcrums 45. The other end of each bell crank 44 bears against one arm of a second bell crank 46 arranged at right angles to the rotatable plates 42. The other arms of these bell cranks 46 extend toward the motor shaft 13 and bear against a rotatable thimble 47 mounted on the end of the shaft 13. Thus, by increasing rotation of the motor armature the thimble 47 is moved farther out from the rotatable plates 42, and this distance is dependent upon the speed of rotation of the motor.

In order to limit the speed to any predetermined value there are provided two contact arms 48 and 49, arranged substantially parallel to each other and transverse to the motor shaft 13. These contact arms are mounted on short arms 77 hingedly mounted on the second casing section 16 as by a hinge pin 50. The other ends of the contact arms carry electrical contacts 51. The thimble 47 extends through an opening 53 in the nearer contact arm 58 and presses against a button 54 on the farther contact arm 49. The nearer short arm 77 has an extended portion 55 engaging a groove 56 in a vertical threaded bolt 58 extending through the top of the casing section 16. The top of this bolt is provided with a cap 59 that may be grasped by the fingers in order to rotate the bolt 58. The contact points 51 are normally held in contact by first spring 60 extending around the hinge pin 50 and bearing against both contact arms 48 and 49. Thus the points 51 are held in contact until the speed of rotation causes the thimble 47 to move the arm 49 away from arm 48 against the urging of spring 60. This breaks the electrical connection to the motor, and the speed slows down until the points 51 again come in contact. The speed may be varied by turning the cap 59 to move the contact arms 48 and 49 toward and away from the motor shaft. In a typical installation the speed range or the speed control is approximately 6 to 1. By providing a second spring 61 extending between the rear of the casing section 16 and the rear portion of the contact arm 49 this speed range may be almost doubled. This type speed governor, its construction, and operation are shown in greater detail in my co-pending application Serial No. 580,114, filed February 28, 1945, now Patent No. 2,532,345.

The contact arms 48 and 49 are preferably made of aluminum, copper, brass or other heat-conducting metal. The contact points 51 are each mounted directly on an arm while each arm is insulated at its base by blocks of insulation 76. The contact arms may or may not be provided with spaced holes to improve the cooling effect of the cooling air.

Each contact point 51 has a head 78 made of tungsten mounted on a bronze base 79 which in turn is fastened to a contact arm. The particular tungsten used in one installation was Grade F tungsten made by the H. A. Wilson Co. of Newark, N. J. Each tungsten head was about 1/32 to 1/16 inch thick and about 1/16 inch in diameter. These contacts were used for over 1,000 hours without any pitting of the surfaces of the contacts.

The cooling air that is circulated through the motor by fan blades 71 is directed across the contact arms 48 and 49 and the contact points 51. This may be accomplished by locating the exit openings 75 adjacent the contact arms, by properly shaping the casing, by providing baffles, or by any combination of these. As illustrated in Figs. 1 and 2 the concentration of air is accomplished both by shaping the casing section 16 and by locating the air exit holes 75 adjacent the contact arms and points.

In the ordinary installations of the speed governor a condenser is provided across the contact points to reduce sparking, and a second condenser is also preferably provided in the electric line.

The casing for the motor and for the speed governor may be made of any material, but is preferably a light weight metal such as aluminum.

As can be seen from the above description, the contact arms 48 and 49, the springs 60 and 61, the threaded bolt 58, and the cap 59 are mounted on the second casing section 16, and the assembly may be removed as a unit. The second casing section is normally held in position by means of a plurality of bolts 62.

The button 54 that is mounted on contact arm 49 is insulated from this arm, and the spring 61 is also insulated from arm 49.

Having described my invention as related to the embodiment set out in the accompanying drawings, it is my intention that the invention be not limited by any of the details of description unless otherwise specified, but rather be construed broadly within its spirit and scope as set out in the accompanying claim.

I claim:

In a variable speed motor construction including a movable make and break switch for controlling the speed thereof, positioning means for the switch, a casing surrounding said construction, and a set of gears operated by said motor: a casing section forming a part of one end of said casing and removable from the remainder thereof including that portion surrounding the motor, said switch and said positioning means being mounted on said casing section to form a removable unit therewith and said positioning means extending through an opening in said section to the exterior thereof, and an integral cup-shaped second casing section forming a part of the other end of said casing, said set of gears being mounted within said second casing section to form a removable unit therewith.

CHARLES HAROLD SPARKLIN.

REFERENCES CITED

The following references are of record in the file of this patent:

UNITED STATES PATENTS

| Number | Name | Date |
|---|---|---|
| 1,434,640 | Wencker | Nov. 7, 1922 |
| 1,965,669 | Robb | July 10, 1934 |
| 2,099,050 | Chamberlain | Nov. 16, 1937 |
| 2,103,589 | Lee | Dec. 28, 1937 |
| 2,143,921 | Lewis | Jan. 17, 1939 |
| 2,187,272 | Kochner | Jan. 16, 1940 |
| 2,188,559 | Taylor | Jan. 30, 1940 |
| 2,241,528 | Strauss et al. | May 13, 1941 |
| 2,292,567 | Jordan | Aug. 11, 1942 |
| 2,353,314 | Lee | July 11, 1944 |
| 2,381,914 | Leflar et al. | Aug. 14, 1945 |